Feb. 28, 1956  J. D. CHRISTIAN  2,736,210
GEAR REDUCTION DRIVE UNITS
Filed Oct. 27, 1952
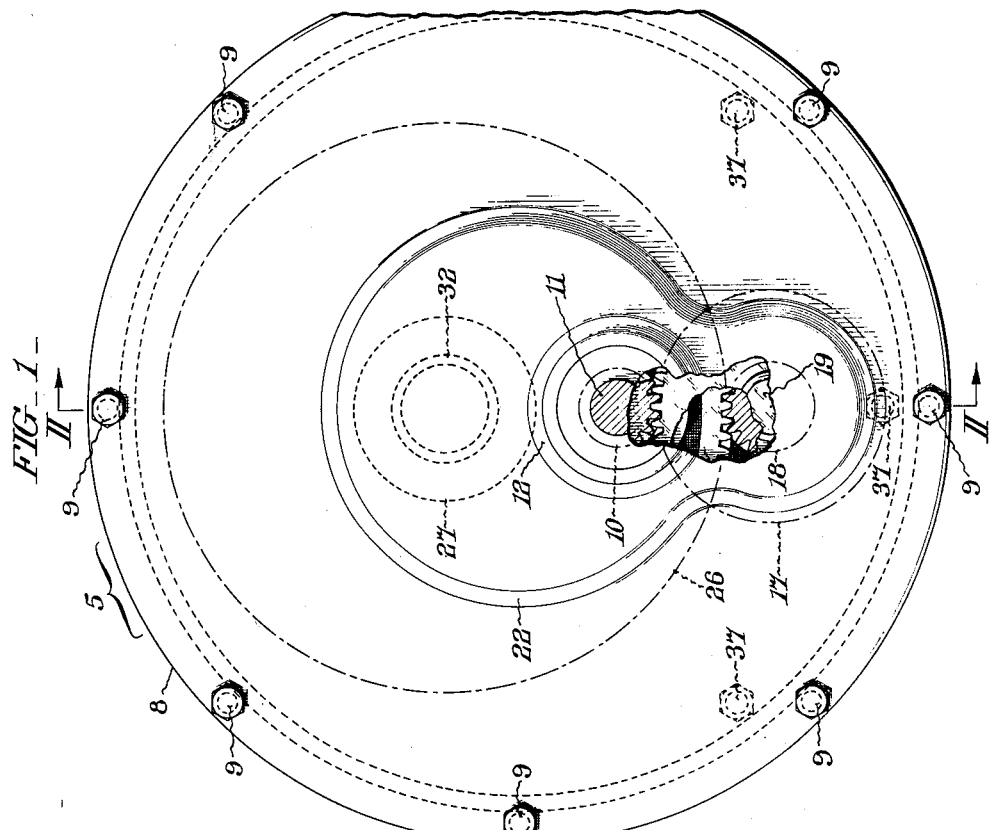
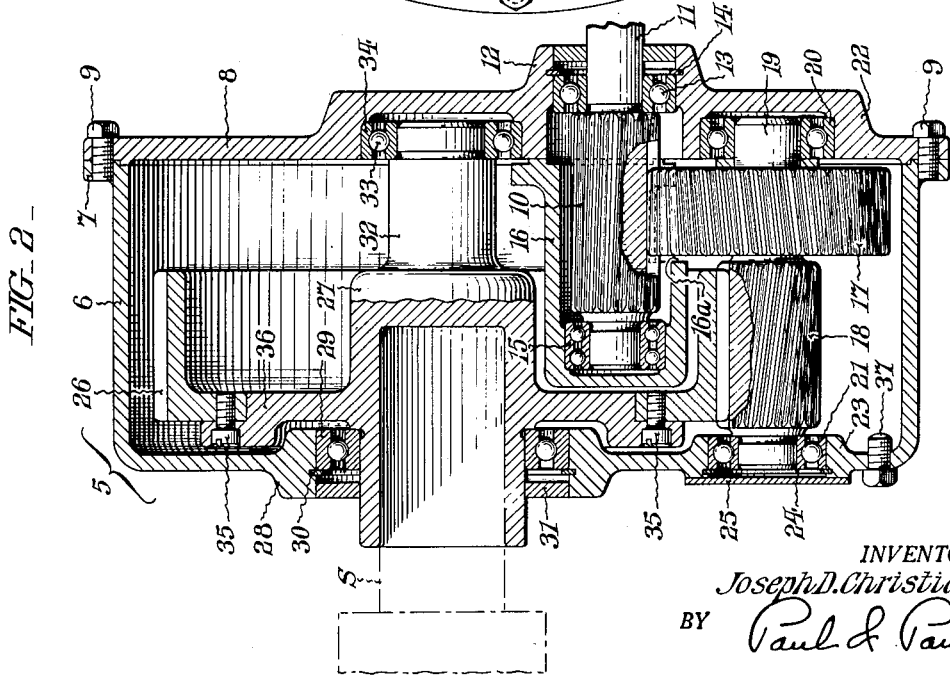
INVENTOR.
Joseph D. Christian,
BY Paul & Paul
ATTORNEYS.

United States Patent Office 2,736,210
Patented Feb. 28, 1956

2,736,210

GEAR REDUCTION DRIVE UNITS

Joseph Dennis Christian, San Francisco, Calif., assignor to The American Pulley Company, Philadelphia, Pa., a corporation of Pennsylvania Application October 27, 1952, Serial No. 317,116

4 Claims. (Cl. 74—421)

This invention relates to gear reduction drive units. More particularly, it is concerned with drive units of the type disclosed in Patent No. 2,116,166 granted to me on May 3, 1938, adapted to be directly connected to and supported upon the end of the shaft of a machine or apparatus which is to be driven. In the patented device, the slow speed output shaft and the powered high speed input shaft are coaxially arranged with the result that a casing of relatively large diameter is required to house the gearing through which the desired speed reduction between the two shafts is obtained.

One of the aims of my present invention is to make possible a closer arrangement of the gearing so that it can be accommodated in a much smaller casing, with a view toward rendering the unit as a whole more compact and correspondingly lighter in weight than heretofore practicable.

Another object is to secure, in a gear reduction drive unit of the type referred to, the maximum spread of bearings in the minimum overall space requirements.

How the foregoing and other important objects and attendant advantages are realized in practice will appear from the following detailed description of the attached drawings wherein:

Fig. 1 shows, in end elevation, a gear reduction drive unit conveniently embodying my invention; and Fig. 2 is a longitudinal sectional view of the unit taken as indicated by the angled arrows II—II in Fig. 1.

As herein exemplified, the casing 5 of my improved gear reduction unit is of circular configuration and comprises a hollow cup section main component 6 with a perimetric flange 7 at its open end, and a cover component 8 secured by cap screws 9 of which the threaded shanks engage into the aforesaid flange at the open end of the main component. The gearing involved is of the helical type and includes a pinion 10 integral with the input shaft 11 which protrudes through a boss 12 on the casing cover component 8 for application, for example, of a pulley (not illustrated) adapted to be driven by belt from an electric motor or other power source. The protruding end portion of input shaft is rotatively supported in a ball bearing 13 which is set into the bore of boss 12, and which is held in place by a snap ring 14. A sealing disk inserted into the open end of boss 12 serves to prevent oil leakage around shaft 11 from the interior of the housing. The opposite end of input shaft 11 is similarly supported in a ball bearing 15 set into the closed end of a bracket 16 in the form of a straddle mount which has a flange at its open end affixed by suitable securing means (not illustrated) to the inner face of the cover component 8 of casing 5. If desired or found more convenient, the straddle mount 16 may be cast integrally with the cover component 8 of casing 5 as will be readily understood. Meshing with pinion 10 is the high speed gear wheel 17 which, together with the low speed pinion 18, is integrally formed on a countershaft 19 whereof the opposite ends are rotatively supported in ball bearings 20 and 21 respectively. At the region of intermesh of gear wheel 17 with pinion 10, the straddle mount 16 is provided with a lateral clearance opening 16a as best shown in Fig. 2. Bearing 20 is set into a recess 22 in casing cover component 8, and bearing 21 into the bore of a boss 23 on the back wall of main casing component 6 in which latter it is held in place by a snap ring 24, the bore of said boss being closed by a sealing disk 25. Meshing in turn with low speed pinion 18 is the large slow speed gear wheel 26 whereof the hub 27 constitutes the output shaft of the unit. As shown, the hub 27 of wheel 26 protrudes through the bore of another boss 28 on the back wall of main casing component 6, and is rotatively supported in a ball bearing 29 set into said boss and secured therein by a snap ring 30. A seal 31 is here also provided to prevent oil leakage from within the casing. The wheel hub 27 is made hollow to engage over the shaft of the machine or apparatus to be driven, and is formed with a diametrically-reduced prolongation 32 which is rotatively supported by a ball bearing 33 set into another recess 34 internally of the casing cover 8. For convenience in machining, the toothed flange of gear wheel 26 is made in the form of a ring and secured by means of cap screws 35 to a radial or spoke web 36 on the hub 27, the arrangement being such that said ring overhangs the inner portion of said hub with attendant provision of a relatively deep annular hollow at one side of the gear into which the straddle mount 16 surrounding the pinion 10 on input shaft 11 extends. From Fig. 1 it will be noted that the shafts all lie in a diametral plane through the axis of housing 5 with the input shaft and the output shaft spaced by substantially equal distances from said axis. The gearing is thus snugly contained within casing 5 and the unit as a whole thereby rendered extremely compact and relatively light in weight, with its weight concentrated so that the cantilever effect upon the shaft S, to which the unit is attached, is reduced to a very minimum and undue flexure and vibration of said shaft thereby effectively prevented.

As is necessary in reduction gear drives of this sort, the unit must be restrained against bodily rotation. The main casing component 6 is accordingly provided in the back wall of its main component at the bottom, with tapped bolt holes for bolts 37 for connection of a torque arm or other suitable restraining device, not illustrated.

It is a well-known fact that in speed reducer design and particularly in the shaft gears, the spread of bearings 13 and 15 has an important relationship to the over-hung input power transmission medium and to the unit, and the spread of bearings 29 and 33 has an important relation to the stability of the unit when mounted on the driven shaft. When the design of the present coaxial unit is compared with prior designs, it is apparent that the present construction affords a greater spread between these bearings and a minimum overall axial distance between the centers of bearings 29 and 13.

I do not of course consider myself limited to the precise construction or shaping of the casing herein shown and described by way of example, nor to the precise construction or arrangement of the parts within it since, obviously, these are amenable to very considerable variation within the spirit of my invention as defined in the appended claims.

Having thus described my invention, I claim:

1. In a two stage gear reduction drive unit a cylindric casing; an output shaft with one end thereof rotatively supported axially in and protruding through one side wall of the casing, and its other end rotatively supported in the other side wall of the casing; a low speed gear wheel on said shaft within the casing, said gear wheel having its toothed peripheral flange projecting laterally from the innermost side of its radial web and overhanging the inner end portion of said shaft with provision of a relatively deep annular hollow between said flange and said shaft; a parallel countershaft spaced from the input shaft with its ends rotatively supported in the opposite side walls of the casing; a high speed gear and a pinion side by side on the countershaft, said pinion being in mesh with the low speed gear; a parallel input shaft with an elongate pinion thereon in mesh with the gear on the countershaft and extending into the hollow of the slow speed gear on the output shaft, said input shaft being disposed intermediate the output shaft and the countershaft and extending to the exterior through and rotatively borne in the casing wall opposite that penetrated by the output shaft; a thimble-like bracket projection secured to the inner side of the casing wall penetrated by the input shaft and surrounding the pinion on the input shaft except at the region of intermesh of said pinion with the gear on the countershaft; and a bearing within the hollow of said bracket projection for the inner end of the input shaft.

2. A drive unit according to claim 1, wherein the input shaft and the countershaft lie in a plane radial to the output shaft.

3. A drive unit according to claim 1, wherein the protruding end of the output shaft is axially hollow to fit over the shaft of a machine or apparatus which is to be driven.

4. A drive unit according to claim 1, wherein the toothed flange of the slow speed gear wheel is separately formed and secured to the radial or spoke web of said wheel.

References Cited in the file of this patent

UNITED STATES PATENTS

| | | |
|---|---|---|
| 1,483,817 | Landry | Feb. 12, 1924 |
| 2,027,149 | Christian | Jan. 7, 1936 |
| 2,116,166 | Christian | May 3, 1938 |
| 2,606,453 | Firth | Aug. 12, 1952 |

FOREIGN PATENTS

| | | |
|---|---|---|
| 161,385 | Switzerland | Apr. 30, 1933 |
| 597,364 | Germany | May 23, 1934 |